(12) United States Patent
Norlin et al.

(10) Patent No.: US 10,171,600 B2
(45) Date of Patent: Jan. 1, 2019

(54) METHODS AND DEVICES FOR PROVIDING INFORMATION

(71) Applicant: Telefonaktiebolaget L M Ericsson (publ), Stockholm (SE)

(72) Inventors: Cristian Norlin, Stockholm (SE); Hongxin Liang, Upplands Väsby (SE); Anna Viggedal, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 359 days.

(21) Appl. No.: 14/911,366

(22) PCT Filed: Aug. 12, 2013

(86) PCT No.: PCT/EP2013/066794
§ 371 (c)(1),
(2) Date: Feb. 10, 2016

(87) PCT Pub. No.: WO2015/022005
PCT Pub. Date: Feb. 19, 2015

(65) Prior Publication Data
US 2016/0191640 A1    Jun. 30, 2016

(51) Int. Cl.
*G06F 15/16*     (2006.01)
*H04L 29/08*    (2006.01)
(Continued)

(52) U.S. Cl.
CPC .......... *H04L 67/22* (2013.01); *G06N 99/005* (2013.01); *G06Q 50/10* (2013.01); *H04L 67/104* (2013.01); *H04L 67/12* (2013.01)

(58) Field of Classification Search
CPC ....... H04L 67/22; H04L 67/104; H04L 67/12; G06N 99/005; G06Q 50/10
See application file for complete search history.

(56) References Cited

U.S. PATENT DOCUMENTS

8,674,842 B2 *   3/2014   Zishaan ................... F24F 11/30
                                                              340/627
9,311,805 B2 *   4/2016   Zishaan ................. G08B 21/12
(Continued)

*Primary Examiner* — Moustafa M Meky
(74) *Attorney, Agent, or Firm* — Murphy, Bilak & Homiller, PLLC (57) ABSTRACT

The present teachings relate a method 10 performed in an arrangement (100) comprising a first device (2) configured to handle data obtained by one or more sensor modules ($S_1, S_2, \ldots, S_n$) and a second device (3) configured to provide information. The method 10 comprises: receiving (11), in the first device (2), one or 5 more variable values relating to one or more contexts ($9_1, 9_2, \ldots, 9_n$) of a system (1), the variable values being obtained by the one or more sensor modules ($S_1, S_2, \ldots, S_n$); determining (12), in the first device (2), an activity index for one or more of the contexts ($9_1, 9_2, \ldots, 9_n$) based on the variable values; retrieving (13), in the second device (3), the activity index for a context ($9_1, 9_2, \ldots, 9_n$; and providing (14), by the 10 second device (3), information based on the retrieved activity index.

30 Claims, 4 Drawing Sheets

(51) Int. Cl.
*G06N 99/00* (2010.01)
*G06Q 50/10* (2012.01)

(56) References Cited

U.S. PATENT DOCUMENTS

| | | | |
|---|---|---|---|
| 2006/0029198 A1 | 2/2006 | Dorneich et al. | |
| 2007/0210929 A1* | 9/2007 | Sabata | G01V 11/00 340/686.5 |
| 2010/0225493 A1* | 9/2010 | Zishaan | F24F 11/30 340/627 |
| 2011/0141967 A1* | 6/2011 | Lane | H04Q 9/00 370/328 |
| 2014/0031082 A1* | 1/2014 | Zishaan | G08B 21/12 455/556.1 |
| 2016/0034634 A9* | 2/2016 | Hong | A61B 5/4866 702/19 |

* cited by examiner

METHODS AND DEVICES FOR PROVIDING INFORMATION

TECHNICAL FIELD

The technology disclosed herein relates generally to the field of network operating centers, and in particular to provision of information in such environments.

BACKGROUND

Nowadays people are flooded with information in various forms, both at work and at home. There are many instances that require the highest attention level of the recipient of the information and for him or her to take proper action based thereon. The abundance of information and handling thereof causes stress to many people, and with increasing stress levels the risk of improper handling of information and actions based thereon, also increases. For example, in a control room supervising for example any type of network there are typically numerous events occurring that have to be detected and possibly acted upon, such as alarms, calls, warnings, anomalies etc. With such intense activity and high workload, information coming in from various sources, there is an enhanced risk of missing critical information or events and thus corresponding risk of taking improper decisions and/or actions. The consequences can be quite severe, depending of course on the type of system being supervised. Further, the health of the persons working under such stressful conditions is also affected.

SUMMARY

An object of the present teachings is to obviate at least some of the above disadvantages and to provide an improved handling of information.

The object is according to a first aspect achieved by a method performed in an arrangement comprising a first device configured to handle data obtained by one or more sensor modules and a second device configured to provide information. The method comprises receiving, in the first device, one or more variable values relating to one or more contexts of a system, the variable values being obtained by the one or more sensor modules; determining, in the first device, an activity index for one or more of the contexts based on the variable values; retrieving, in the second device, the activity index for a context; and providing, by the second device, information based on the retrieved activity index.

Advantages provided by means of the method comprise, inter alia, reduced risk of improper decisions being made or faulty actions being taken. The determination of an activity index for a context (e.g. one person), and provision of information based thereon enables provision of information only to contexts (e.g. the person) that have a low activity index and that is able to properly handle and act upon the information.

The object is according to a second aspect achieved by an arrangement comprising a first device configured to handle data obtained by one or more sensor modules and a second device configured to provide information. The first device comprises a processor and memory, the memory containing instructions executable by the processor, whereby the first device is operative to: receive one or more variable values relating to one or more contexts of a system, the variable values being obtained by the one or more sensor modules; and determine an activity index for one or more of the contexts based on the variable values. The second device comprises a processor and memory, the memory containing instructions executable by the processor, whereby the second device is operative to: retrieve the activity index for a context; and provide information based on the retrieved activity index.

The object is according to a third aspect achieved by a method performed in a first device of an arrangement. The first is configured to handle data obtained by one or more sensor modules of a system. The method comprises: receiving one or more variable values relating to one or more contexts of the system, the variable values being obtained by the one or more sensor modules; and determining an activity index for one or more of the contexts based on the variable values.

The object is according to a fourth aspect achieved by a first device of an arrangement, the first device being configured to handle data obtained by one or more sensor modules of a system. The first device comprises a processor and memory, the memory containing instructions executable by the processor, whereby the first device is operative to: receive one or more variable values relating to one or more contexts the system, the variable values being obtained by the one or more sensor modules; and determine an activity index for one or more of the contexts based on the variable values.

The object is according to a fifth aspect achieved by a method performed in a second device of an arrangement. The second device is configured to provide information and the arrangement comprises a first device being configured to handle data obtained by one or more sensor modules of a system. The method comprises: retrieving, from the first device, an activity index for a context, wherein the activity index for the context is based on variable values relating to the context, the variable values being obtained by the one or more sensor modules; and providing information based on the retrieved activity index.

The object is according to a sixth aspect achieved by a second device of an arrangement. The second device is configured to provide information and the arrangement comprises a first device being configured to handle data obtained by one or more sensor modules of a system. The second device comprises a processor and memory, the memory containing instructions executable by the processor, whereby the second device is operative to: retrieve, from the first device, an activity index for a context, wherein the activity index for the context is based on variable values relating to the context, the variable values being obtained by the one or more sensor modules; provide information based on the retrieved activity index.

Further features and advantages of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods may be omitted so as not to obscure the description with unnecessary detail. Same reference numerals refer to same or similar elements throughout the description.

Figure 1:
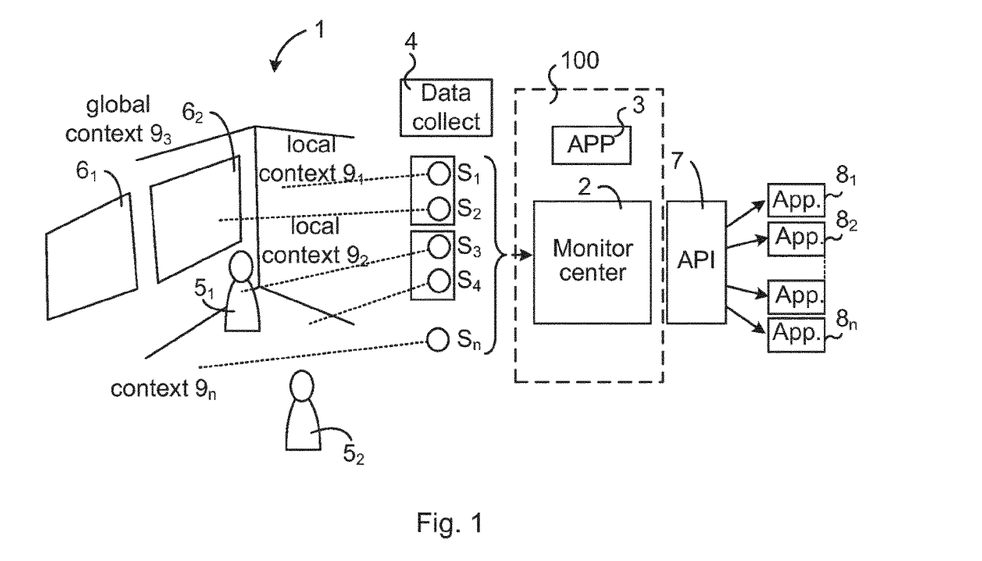
FIG. 1 illustrates schematically an environment in which embodiments of the present teachings may be implemented.

The present teachings may be implemented in many different types of environments, for example a network operating center (NOC), wherein network monitoring and control may be exercised over e.g. a computer network, telecommunication network, or satellite network. The environment may comprise a control center wherein supervision of e.g. a power network or railway system is effectuated, or it may comprise an emergency service center or a call center to mention a few more examples. FIG. 1 illustrates schematically one such environment, in particular a network operating center 1 in which embodiments of the present teachings may be implemented.

The network operating center 1, in the following also denoted system 1, comprises one or more contexts $9_1$, $9_2$, $9_3$. A context refers to a defined space, wherein a group of people or one single person is present. A context may be global, i.e. global context, which comprises a defined space wherein a group of people are present, e.g. are working. A context may be local, i.e. local context, which may thus comprise part of the global context, e.g. part of the defined space wherein part (or all) persons are working. For example, the global context may be an entire NOC operating center including all personnel, a local context (or sub-context) may be a group of people who are sitting in the northeast corner of the NOC operating center and a sub-subcontext may then be one particular person of the group of people in the northeast corner. In short, a context can be defined in various ways, but always comprises at least one person.

The system 1 may comprise sensor modules $S_1$, $S_2$, $S_3$, $S_4$, . . . , $S_n$ and/or detectors or at least have access to such sensor modules and/or detectors; i.e. the sensor modules need not be part of the system 1. The sensor modules $S_1$, $S_2$, $S_3$, $S_4$, . . . , $S_n$ may comprise physical devices and/or software based modules executed in a processor. The sensor modules $S_1$, $S_2$, $S_3$, $S_4$, . . . , $S_n$, may comprise e.g. motion sensor, acceleration sensor, thermometer, sound detector, heart rate sensor, camera or software configured to detect how fast a person is typing on a keyboard, how frequently the person is using a computer mouse etc.

The system 1 may comprise a data collecting device 4 configured to collect any kind of data about a certain context $9_1$, $9_2$, $9_3$. For example, the data collecting device 4 may be configured to collect data from the sensor modules $S_1$, $S_2$, $S_3$, $S_4$, . . . , $S_n$ and/or detectors. The data collecting device 4 may be a physical device or part of another physical device. For example, in embodiments wherein a first device 2, which will be described next, is a physical device, the data collecting device 4 may be part of this first device 2.

The system 1 comprises a first device 2, in the following also denoted monitor center 2. The monitor center 2 is configured to gather data, e.g. by receiving measurement values directly from the sensor modules $S_1$, $S_2$, $S_3$, $S_4$, . . . , $S_n$ or via the data collecting device 4. The monitor center 2 is further configured to use the gathered data, possibly aggregate it and then use the data to predict an activity index. The monitor center 2 may also be configured to identify local contexts. The monitor center 1 may be implemented as a physical device or a service running in a cloud computing environment. The monitor center 2 is described further with reference to FIG. 5. The monitor center 2 defines and/or identifies the earlier mentioned contexts. The monitor center 2 may receive input from a person manually entering and defining a context, e.g. an administrator of the monitor center 2 specifying that the northeast corner is a context. The monitor center 2 may alternatively (or in addition to the manual input) be configured to automatically identify a context; for example based on data received from one or more of the sensor modules $S_1$, $S_2$, $S_3$, $S_4$, . . . , $S_n$. The monitor center 2 may thus be configured to automatically identify a context based on local information in a particular part of the network operating center 1 space. As a particular example of this, the monitor center 2 may be configured to process data from the sensor modules $S_1$, $S_2$, $S_3$, $S_4$, . . . , $S_n$ so as to identify a context for an increased noise level in a certain part of the network operating center 1 where something may be happening causing the increased noise level.

An activity level of a context is represented by an activity level index, also denoted activity index. The monitor center 2 is configured to predict such an activity index for a context. That is, activity index represents the level of activity in a context. As mentioned earlier, a context may be local or global, and correspondingly, the activity index can also be a local or global activity index. A global activity index is determined for a global context and a local activity index is determined for a local context. The activity level may be expressed as an activity index having a value ranging e.g. from 0 to 1, where 0 means very low activity level and 1 means very high activity level. It is noted that other ranges may alternatively be used. The activity level can be instantiated for example to represent how busy the context at hand is, the stress level of the context or how eased or relaxed the context is.

In particular, the monitor center 2 receives data values from some or all the sensor modules $S_1$, $S_2$, $S_3$, $S_4$, . . . , $S_n$. From inserted values and/or by machine learning, the monitor center 2 has knowledge about threshold values or tolerance intervals corresponding to an activity index for each kind of measurement. For example, the noise level of 90 dB may correspond to activity index 0.8, and if the noise level exceeds the configured threshold value of x dB some action may be taken, e.g. any prioritized information may be presented in non-audial ways and/or complemented with visual or tactual signals or preferably directed to another sub-context. These values known by the monitor center 2 can for example be standard recommended values or attained through machine learning (history). An algorithm in the monitor center 2 may be provided for calculating/predicting the total activity index for the context (local, global, super local etc.) by combining the activity levels measured by each kind of sensor module $S_1$, $S_2$, $S_3$, $S_4, \ldots, S_n$ relating to respectively context/context level. Hence the algorithm may compare activity indices from different sorts of sensor modules and compare and relate them to each other.

For each type of sensor, there may thus be a mapping table between a certain sensor value and corresponding activity index value. For example, 0-30 dB maps to 0.1, 31-45 dB maps to 0.2, etc. As another example, 0-10 w/m (words per minute when typing keyboard) maps to 0.1, 11-50 w/m maps to 0.2 etc. Such mapping tables may be statically defined by observing sensor values and actual activity levels. In order to aggregate all the different sensor values, different weights can be assigned to different activity index values. By observing sensor values repeatedly, all those mapping tables can be then fed into a machine learning algorithm in order to train the relation between sensor value and index value.

Figure 2:
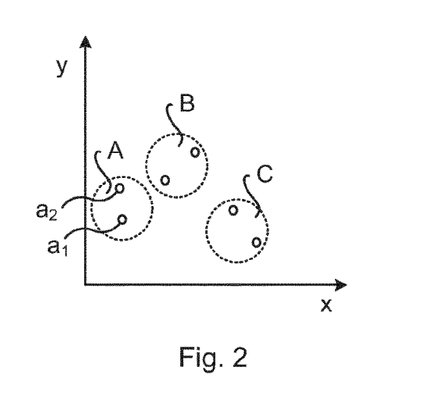
FIG. 2 is an illustration of the concept of local context.

FIG. 1 illustrates a global context $9_3$ comprising a NOC space or room and two local contexts $9_1$, $9_2$ comprising a respective part of the NOC space. The contexts $9_1$, $9_2$, $9_3$ may be identified automatically by the monitor center 2. With reference now to FIG. 2, a clustering algorithm will be described, which may be configured in the monitor center 2. The clustering algorithm may be adapted to identify local contexts based on location. For example, two persons $a_1$, $a_2$ having approximately the same location within a space may be identified as a local context A. Such physical locations can be translated to a graph as illustrated in FIG. 2, to be identified by an x-value (along the x-axis) and a y-value (along the y-axis). Other local contexts B and C may be identified in a corresponding way.

Figure 3:
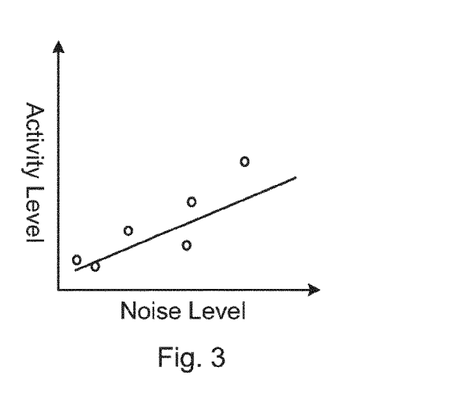
FIG. 3 illustrates an example of a machine learning algorithm.

In order to predict an activity index, a machine-learning algorithm may be used. Such machine-learning algorithm needs to be trained with existing data and activity levels. A first example of such machine-learning algorithm comprises a linear regression, another example comprises polynomial regression. With reference now to FIG. 3, use of linear regression is illustrated. Data may be obtained from one or more of the sensor modules $S_1$, $S_2$, $S_3$, $S_4$, $\ldots$, $S_n$. For example, data may be obtained from a sound detector and activity levels are observed under different noise levels (as measured by the sound detector), as described earlier. Analysis based on readings from different sources, e.g. sensor modules, microphones, video motion detectors etc., is performed. Such analysis may comprise e.g. individual analysis of the readings, analysis of relations between readings, comparisons with historical readings etc. In FIG. 3, dots indicate such observations, and the unbroken line illustrates the result of the machine-learning algorithm being trained to predict activity level based on noise level. Corresponding processes apply to all other types of data collected by the data collector 4 or collected by the monitor center 2 directly.

For each group of data from one type of sensor module (a group of data may for example be all data collected from all sound detectors) as collected by the data collector 4 or monitor center 2, an activity index can be predicted. An example of a process for normalizing and calculating a final predicted activity index, taking into account all groups of data, is given in the following.

Let $P_i$ be the predicted activity indices for different groups of data, i indicating a particular group of data. For example, a first group of data may comprise all data collected from one or more sound detectors, a second group of data may comprise the data collected from one or more heart rate detectors etc. Let $\alpha_i$ be a corresponding weight for the different groups of data, where $$\sum_i \alpha_i = 1$$

Data may for example be weighed against recommended cognitive and physical ergonomics data and tolerable data values for healthy work environment etc. Comparing data from the sensor modules to standard values provides indications on whether the activity index is too high to provide additional information to a sub-context and if the personnel's cognitive load is too high. Then the monitor center 2 may compare activity levels between sub-contexts to determine which sub-context should receive certain information etc.

The final predicted activity level P may then be calculated as $$P = \sum_i \alpha_i * P_i$$

The above process for predicting activity index may be described by:
1. The monitor center 2 gathers data from all or selected sensor modules and/or any detectors available
2. The monitor center 2 groups data by context
3. The monitor center 2 predicts global activity index and/or local activity index for each context The predicted activity index/indices can be cached in a memory in order to avoid too frequent calculation, as the activity level does typically not change that quickly. The activity index may for example be predicted continuously, or at certain points of time, with certain intervals or upon request.

The monitor center 2 provides or exposes an application programming interface (API), in the FIG. 1 denoted by reference numeral 7. The monitor center 2 exposes the APIs 7 for external applications 3, $8_1$, $8_2$, $\ldots$, $8_n$, in particular providing the applications 3, $8_1$, $8_2$, $\ldots$, $8_n$, with activity indices. That is, the applications 3, $8_1$, $8_2$, $\ldots$, $8_n$ may retrieve an activity index for a certain context from the API 7.

The applications 3, $8_1$, $8_2$, $\ldots$, $8_n$ may comprise a physical device, e.g. devices such as air conditioners or light controller, or the applications 3, $8_1$, $8_2$, $\ldots$, $8_n$ may comprise one or more software modules or combinations of physical devices and software modules.

The system 1 may comprise a number of displays or screens $6_1$, $6_2$ on which any type of information may be displayed, comprising e.g. information about a system that is being supervised, the information being in form of text, figures, moving films, alarms etc.

In an aspect, the present teachings provide an arrangement 100 comprising the monitor center 2 (also denoted first device) and an application 3 (also denoted second device). In such arrangement 100, the monitor center 2 predicts an activity index and exposes, as mentioned earlier, APIs 7 for external applications to retrieve an activity index for a specified context, in a manner as described earlier. The second device 3 may then take certain action based on the retrieved activity index. Examples of such actions comprise e.g. provide selected information to selected contexts, provide reduced information to a context with high activity index etc.

When activity levels and workload in a context are very high, prioritization of what information and what events to present to the personnel (e.g. operators working in the NOC 1) and hence act upon, are important for an efficient workflow and for avoidance of cognitive overload of the personnel. Non-critical information does not have to be presented at all to personnel with currently high activity level if there are more urgent information/events occurring simultaneously. This efficiently avoids the risk of missing critical information/event when the cognitive load of the personnel is high and there is an abundance of (non-critical) information.

In various embodiments, the interface between which device 2, 3 does what is designed in different ways. For example, in an embodiment, the monitor center 2 is configured to predict an activity index for a context, and configured to provide information based thereon, e.g. reducing the amount of information to provide to contexts having high activity level. In such embodiment, the API 7 may then expose activity index and also reduced information based thereon for external applications to retrieve.

Figure 4:
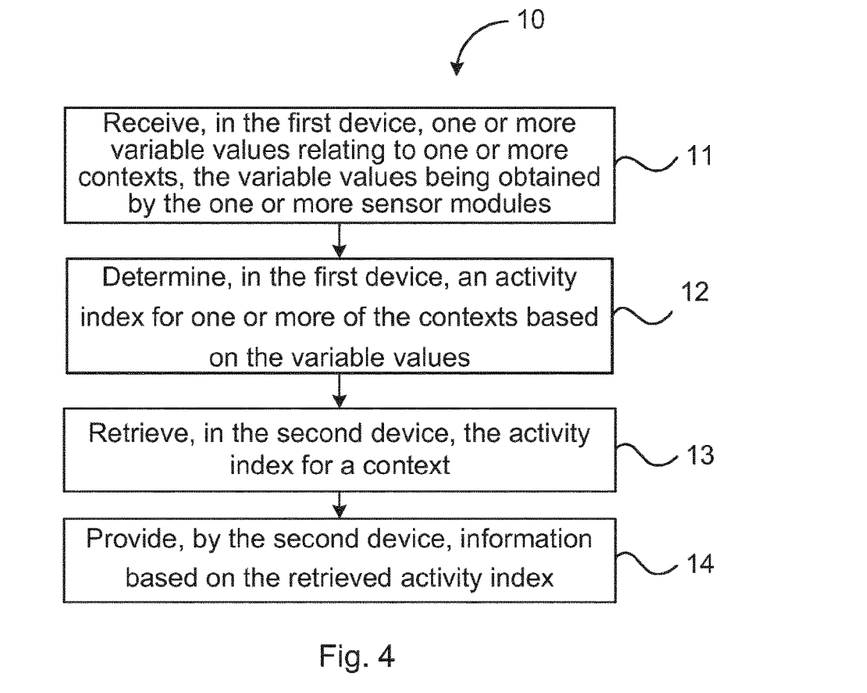
FIG. 4 illustrates a flow chart over steps of a method in an arrangement in accordance with the present teachings.

FIG. 4 illustrates a flow chart over steps of a method 10 in an arrangement 100 in accordance with the present teachings. The method 10 is performed in an arrangement 100 comprising a first device 2 (e.g. monitor center) configured to handle data obtained by one or more sensor modules $S_1, S_2, \ldots, S_n$ and a second device 3 (e.g. application) configured to provide information. The method 10 comprises receiving 11, in the first device 2, one or more variable values relating to one or more contexts $9_1, 9_2, \ldots, 9_n$ of a system 1. The variable values are obtained by the one or more sensor modules $S_1, S_2, \ldots, S_n$. The system 1 may comprise any of the earlier mentioned examples, e.g. NOC.

The method 10 comprises determining 12, in the first device 2, an activity index for one or more of the contexts $9_1, 9_2, \ldots, 9_n$ based on the variable values. This determination may be done as described e.g. in relation to FIGS. 2 and 3.

The method 10 comprises retrieving 13, in the second device 3, the activity index for a context $9_1, 9_2, \ldots, 9_n$. The retrieval 13 may be performed in different ways; for example if the second device is a device comprising a software module, the activity index may be obtained over any type of communication network, such as for example blue-tooth or Ethernet, depending on the type of device 3 and its capabilities and type of input/output means.

The method 10 comprises providing 14, by the second device 3, information based on the retrieved activity index. If for example, an activity index for a certain context is very low, all available information may be provided to this context. If on the other hand, an activity index for a context is very high, reduced amount of information may be provided to such context.

In an embodiment, the method 10 comprises, in the first device 2, to identify a context $9_1, 9_2, \ldots, 9_n$ and determine 12 an activity index for the identified context $9_1, 9_2, \ldots, 9_n$.

In a variation of the above embodiment, the identifying is performed based on data obtained by the one or more sensor modules $S_1, S_2, \ldots, S_n$ or based on data input by user.

In an embodiment, the providing 14 of information comprises providing information in adjusted amount based on the activity index.

In an embodiment, the method 10 further comprises, in the second device 3, comparing the activity index to a threshold activity index. In this embodiment, the providing 14 of information comprises providing, for an activity index being larger than the threshold activity index, a reduced amount of information to the context related to this activity index.

In a variation of the above embodiment, the method 10 further comprises, in the second device 3, prioritizing information and the information is reduced by removing information having a priority below a priority threshold value. That is, the information is prioritized e.g. in the order of importance, and information of less importance (i.e. lower priority, and in particular priority below a configured priority threshold value) is not provided to this context.

In an embodiment, the determining 12 comprises predicting the activity index using a machine-learning algorithm. One example of this has been described with reference to FIGS. 2 and 3.

In an embodiment, wherein, in case of two or more contexts $9_1, 9_2, \ldots, 9_n$, the determining 12 comprises grouping the two or more contexts $9_1, 9_2, \ldots, 9_n$ into two or more context layers and determining an activity index for each context $9_1, 9_2, \ldots, 9_n$, of each context layer. For example, two or more contexts may form a super-context in an upper layer, and two or more super-contexts can in turn form super-super-context. For example, and with reference again to FIG. 1, local context $9_1$ and local context $9_2$ form the global context $9_3$. An activity index may be calculated (predicted) for every context in each context layer.

In a variation of the above embodiment, the method 10 further comprises comparing the activity index for each context to a threshold activity index, and wherein the providing 14 of information comprises providing only part of an available amount of information to a context having an activity index higher than the threshold activity index and withholding the remaining part of the information.

In a variation of the above embodiment, the information being withheld from the first context is provided to a context having an activity index lower than the threshold activity index. The activity level can vary locally within a global context (e.g. vary between different parts of the system 1 or vary between different work groups), and also vary on an individual level. By taking these variations into account by various measurements by the sensor modules, and the average activity level in the context (e.g. stress level, audio level, motion, temperature etc.) the workload and amount of information/events provided or presented can be adjusted accordingly.

In an embodiment, the providing 14 of information comprises one or more of: displaying information on a screen, providing an audible alarm, providing a call, and providing a warning in form of an alarm. The term "information" thus has a broad interpretation and should be construed to encompass a wide variety of information types, e.g. audible, visible, tactile and/or perceptible in other ways and presented in different ways, e.g. as sounding alarms, blinking lamps, on a display etc.

In an embodiment, the providing 14 of information comprises providing audible, visual and/or tactile signals based on the activity index.

In an embodiment, a context $9_1, 9_2, \ldots, 9_n$ is defined for one or more users located within the system 1.

In various embodiments, the sensor modules comprise one or more of: motion sensor, acceleration sensor, thermometer, sound detector, heart rate sensor, camera, microphone, a module within the system 1 configured to detect speed of key strokes of a keyboard.

As has already been described earlier, the present teachings also provide an arrangement 100 (refer to FIG. 1) comprising a first device 2 configured to handle data obtained by one or more sensor modules $S_1, S_2, \ldots, S_n$ and a second device 3 configured to provide information. In such arrangement 1, the first device 2 comprises a processor 30 and memory 33, the memory 33 containing instructions executable by the processor 30, whereby the first device 2 is operative to:

receive one or more variable values relating to one or more contexts $9_1, 9_2, \ldots, 9_n$ of a system 1, the variable values being obtained by the one or more sensor modules $S_1, S_2, \ldots, S_n$, and determine an activity index for one or more of the contexts $9_1, 9_2, \ldots, 9_n$ based on the variable values.

In the arrangement 100, the second device 3 comprises a processor 40 and memory 43, the memory 43 containing instructions executable by the processor 40, whereby the second device 3 is operative to:

retrieve the activity index for a context $9_1, 9_2, \ldots, 9_n$, and provide information based on the retrieved activity index.

Figure 5:
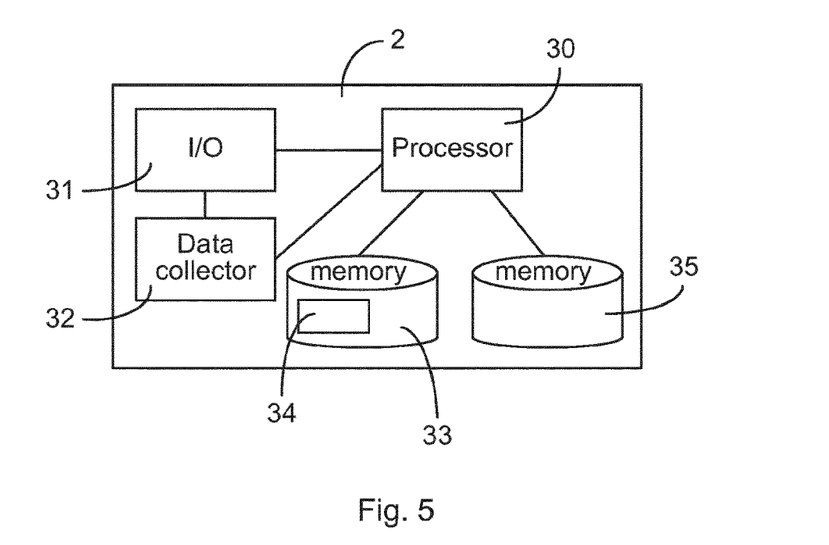
FIG. 5 illustrates schematically a first device comprising means for implementing methods of the present teachings.

FIG. 5 is a schematic illustration showing some components of the monitor center 2 of FIG. 1. A processor 30 is provided using any combination of one or more of a central processing unit (CPU), multiprocessor, microcontroller, digital signal processor (DSP), application specific integrated circuit etc. capable of executing software instructions 34 stored in a memory 33, which can thus be a computer program product. The processor 30 can be configured to execute a method 20 which will be described with reference to FIG. 6.

The memory 33 can be any combination of read and write memory (RAM) and read only memory (ROM). The memory 33 also comprises persistent storage, which, for example, can be any single one or combination of magnetic memory, optical memory, solid state memory or even remotely mounted memory.

The monitor center 2 may also comprise a data memory 35 for reading and/or storing data during execution of software instructions in the processor 30. The data memory 35 can be any combination of RAM and ROM.

The monitor center 2 further comprises an input/output (I/O) device 31 for communicating with other external entities, e.g. using a wired network connection such as Ethernet or a wireless connection such as Bluetooth, or a wireless local area network (WLAN) or a mobile network. The I/O device 31 may comprise a software interface, and/or it may comprise means such as antennas for receiving wireless signaling from the sensor modules $S_1, S_2, S_3, S_4, \ldots, S_n$.

In an embodiment, the monitor center 2 comprises a data collector 32 provided for collecting any kind of data about a certain context, e.g. a particular user or a particular group of users. For example, the data collector 32 may be configured to receive data from the sensor modules $S_1, S_2, S_3, S_4, \ldots, S_n$, which in turn measures data relating to such particular user or particular group of users. In another embodiment, the monitor center 2 is configured to receive or retrieve such data from the external data collector 4 (as illustrated in FIG. 1), which may likewise be configured to receive data from the sensor modules $S_1, S_2, S_3, S_4, \ldots, S_n$, which in turn measures data relating to such particular user or particular group of users.

It is thus noted that although the monitor center 2 is illustrated as a single device, comprising the above described components, in other embodiments one or more of the components may be separate units operatively connected to the monitor center 2.

Figure 6:
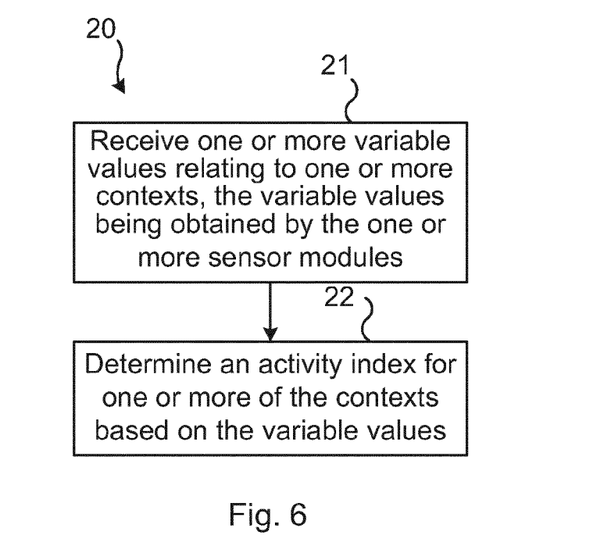
FIG. 6 illustrates a flow chart over steps of a method in a first device in accordance with the present teachings.

With reference now to FIG. 6, the present teachings also encompass a method 20 performed in a first device 2 of an arrangement 100 as described. The first device 2 is configured to handle data obtained by one or more sensor modules $S_1, S_2, \ldots, S_n$ of a system 1. The method 20 comprises:

receiving 21 one or more variable values relating to one or more contexts $9_1, 9_2, \ldots, 9_n$ of the system 1, the variable values being obtained by the one or more sensor modules $S_1, S_2, \ldots, S_n$, and determining 22 an activity index for one or more of the contexts $9_1, 9_2, \ldots, 9_n$ based on the variable values.

In an embodiment, the method 20 comprises identifying a context $9_1, 9_2, \ldots, 9_n$ and determining 22 an activity index for the identified context $9_1, 9_2, \ldots, 9_n$.

In a variation of the above embodiment, the identifying is performed based on data obtained by the one or more sensor modules $S_1, S_2, \ldots, S_n$ or based on data input by user.

In an embodiment, the determining 22 comprises predicting the activity index using a machine-learning algorithm.

In an embodiment, wherein, in case of two or more contexts $9_1, 9_2, \ldots, 9_n$, the determining 22 comprises grouping the two or more contexts $9_1, 9_2, \ldots, 9_n$ into two or more context layers and determining an activity index for each context $9_1, 9_2, \ldots, 9_n$ of each context layer.

In an embodiment, a context $9_1, 9_2, \ldots, 9_n$ is defined for one or more users located within the system 1.

In an embodiment, the method 20 comprises providing information based on the activity index. That is, the first device 2 is configured to determine activity index for a context, based on variable values it has received and which variable values have been provided by sensor modules. The first device 2 is also configured to provide information based on the activity index.

With reference again to FIG. 5, the present teachings also encompass computer programs and computer program products. A computer program 34 is provided for a first device 2 of an arrangement 100. The first device 2 is configured to handle data obtained by one or more sensor modules $S_1, S_2, \ldots, S_n$ of a system 1. The computer program 34 comprises computer program code, which, when run on the first device 2 causes the first device 2 to perform the methods as described. In particular causes the first device 2 to:

receive one or more variable values relating to one or more contexts $9_1, 9_2, \ldots, 9_n$ of the system 1, the variable values being obtained by the one or more sensor modules $S_1, S_2, \ldots, S_n$, and determine an activity index for one or more of the contexts $9_1, 9_2, \ldots, 9_n$ based on the variable values.

The computer program product 33, or the memory 33, comprises instructions executable by the processor 30. Such instructions may be comprised in a computer program 33, or in one or more software modules or function modules.

Figure 7:
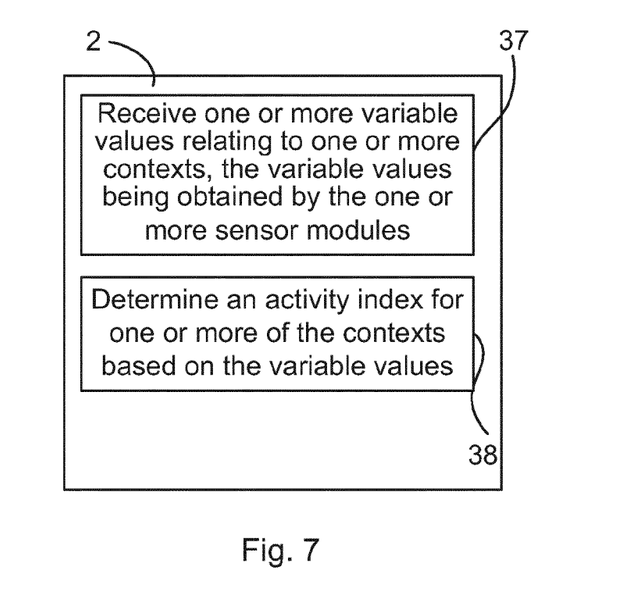
FIG. 7 illustrates a first device comprising function modules/software modules for implementing embodiments of the method of FIG. 6.

An example of an implementation using functions modules/software modules is illustrated in FIG. 7, in particular illustrating the first device 2 comprising functions modules for implementing embodiments of the methods as described. The first device 2 comprises means 37, in particular a first function module 37, for receiving one or more variable values relating to one or more contexts $9_1, 9_2, \ldots, 9_n$ of the system 1, the variable values being obtained by the one or more sensor modules $S_1, S_2, \ldots, S_n$ (compare step 21 of FIG. 6). The first device 2 comprises means 38, in particular a second function module 38, for determining an activity index for one or more of the contexts $9_1, 9_2, \ldots, 9_n$ based on the variable values (compare step 22 of FIG. 6).

The functional modules 37, 38, can be implemented using software instructions such as computer program executing in a processor and/or using hardware, such as application specific integrated circuits, field programmable gate arrays, discrete logical components etc.

The teachings of the present application also encompasses a computer program product 33 comprising a computer program 34 as described above, and a computer readable means on which the computer program 34 is stored. The computer program product 33 may be any combination of read and write memory (RAM) or read only memory (ROM). The computer program product 33 may also comprise persistent storage, which for example can be any single one or combination of magnetic memory, optical memory or solid state memory.

Figure 8:
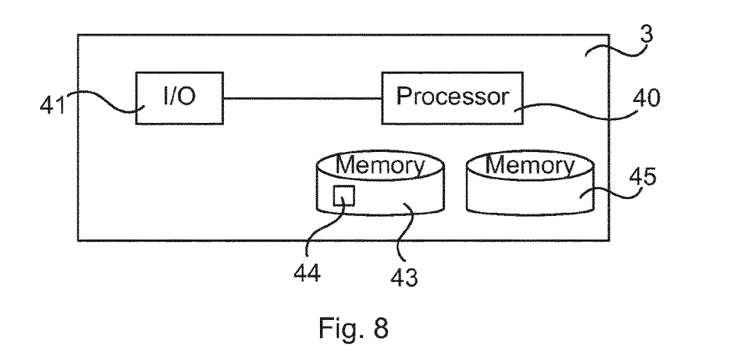
FIG. 8 illustrates schematically a second device comprising means for implementing methods of the present teachings.

FIG. 8 is a schematic illustration showing some components of the second device 3 (application) of FIG. 1, and in particular of the arrangement 100. A processor 40 is provided using any combination of one or more of a central processing unit (CPU), multiprocessor, microcontroller, digital signal processor (DSP), application specific integrated circuit etc. capable of executing software instructions stored in a memory 43, which can thus be a computer program product. The processor 40 can be configured to execute a method 30 which will be described with reference to FIG. 9.

The memory 43 can be any combination of read and write memory (RAM) and rad only memory (ROM). The memory 43 also comprises persistent storage, which, for example, can be any single one or combination of magnetic memory, optical memory, solid state memory or even remotely mounted memory.

The second device 3 may also comprise a data memory 45 for reading and/or storing data during execution of software instructions in the processor 40. The data memory 45 can be any combination of RAM and ROM.

The second device 3 further comprises an input/output (I/O) device 41 for communicating with other external entities, e.g. using a wired network connection such as Ethernet. The I/O device 41 may comprise a software interface, and/or it may comprise means, such as antennas, for receiving wireless signaling from the sensor modules $S_1$, $S_2$, $S_3$, $S_4$, ..., $S_n$.

Figure 9:
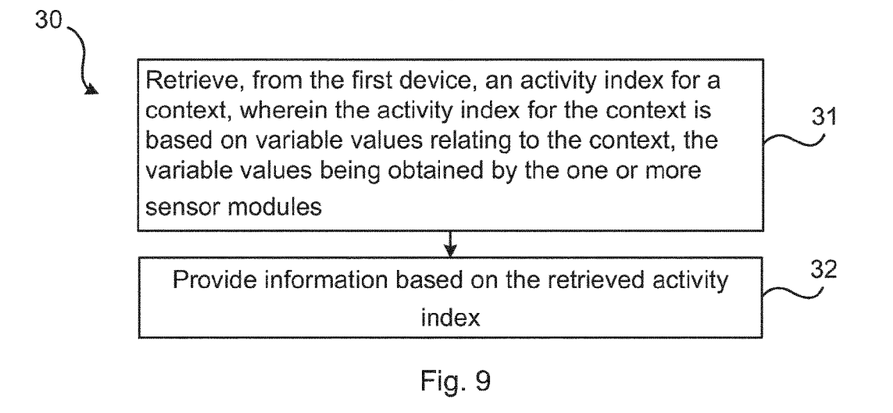
FIG. 9 illustrates a flow chart over steps of a method in a second device in accordance with the present teachings.

With reference now to FIG. 9, the present teachings also encompass a method 30 performed in a second device 3 of an arrangement 100 as described. The second device 3 is configured to provide information and the arrangement 100, which comprises a first device 2 being configured to handle data obtained by one or more sensor modules $S_1$, $S_2$, ..., $S_n$ of a system 1. The method 30 comprises:

retrieving 31, from the first device 2, an activity index for a context $9_1$, $9_2$, ... $9_n$, wherein the activity index for the context $9_1$, $9_2$, ..., $9_n$ is based on variable values relating to the context $9_1$, $9_2$, ..., $9_n$, the variable values being obtained by the one or more sensor modules $S_1$, $S_2$, ..., $S_n$, and providing 32 information based on the retrieved activity index.

In an embodiment, the providing 32 of information comprises providing information in adjusted amount based on the activity index.

In an embodiment, the method 30 comprises comparing the activity index to a threshold activity index, and wherein the providing 32 of information comprises providing, for an activity index being larger than the threshold activity index, a reduced amount of information.

In a variation of the above embodiment, the method 30 further comprises prioritizing information and wherein the information is reduced by removing information having a priority below a priority threshold value.

In a variation of the above embodiment, the method 30 further comprises comparing the activity index for each context to a threshold activity index, and wherein the providing 32 of information comprises providing only part of an available amount of information to a context having an activity index being higher than the threshold activity index and withholding the remaining part of the information.

In a variation of the above embodiment, the information being withheld from the first context is provided to a context having an activity index lower than the threshold activity index.

In an embodiment, the providing 32 of information comprises one or more of: displaying information on a screen, providing an audible alarm, providing a call, and providing a warning in form of an alarm.

In an embodiment, the providing 32 of information comprises providing audible, visual and/or tactile signals based on the activity index.

In an embodiment, a context $9_1$, $9_2$, ..., $9_n$ is defined for one or more users located within the system 1.

With reference again to FIG. 8, the present teachings also encompass computer programs and computer program products. A computer program 44 is provided for a second device 3 of an arrangement 100. The second device 3 is configured to provide information and the arrangement 100, which also comprises a first device 2 being configured to handle data obtained by one or more sensor modules $S_1$, $S_2$, ..., $S_n$ of a system 1. The computer program 44 comprises computer program code, which, when run on the second device 3 causes the second device 3 to perform the methods as described. In particular causes the second device 3 to:

retrieve, from the first device 2, an activity index for a context $9_1$, $9_2$, ..., $9_n$, wherein the activity index for the context $9_1$, $9_2$, ..., $9_n$ is based on variable values relating to the context $9_1$, $9_2$, ..., $9_n$, the variable values being obtained by the one or more sensor modules $S_1$, $S_2$, ..., $S_n$, providing information based on the retrieved activity index.

The computer program product 43, or the memory 43, comprises instructions executable by the processor 40. Such instructions may be comprised in a computer program 43, or in one or more software modules or function modules.

Figure 10:
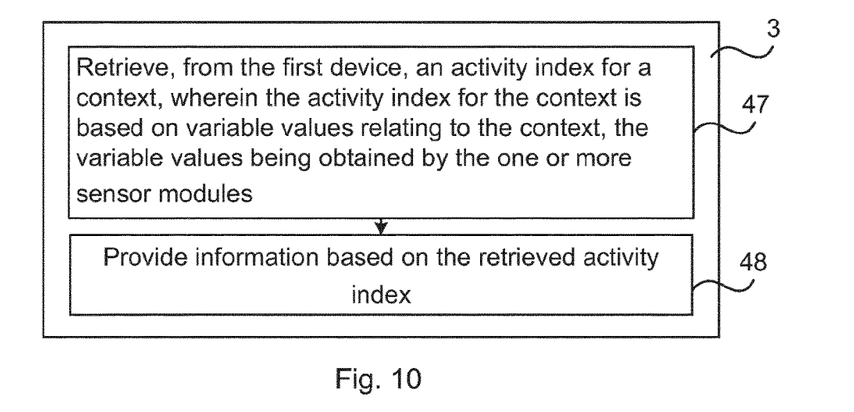
FIG. 10 illustrates a second device comprising functions modules/software modules for implementing embodiments of the method of FIG. 9.

An example of an implementation using functions modules/software modules is illustrated in FIG. 10, in particular illustrating a second device 3 comprising functions modules for implementing embodiments of the methods as described. The second device 3 comprises means 47, in particular a first function module 47, for retrieving, from the first device 2, an activity index for a context $9_1$, $9_2$, ..., $9_n$, wherein the activity index for the context $9_1$, $9_2$, ..., $9_n$ is based on variable values relating to the context $9_1$, $9_2$, ..., $9_n$, the variable values being obtained by the one or more sensor modules $S_1$, $S_2$, ..., $S_n$, (compare step 31 of FIG. 8). The second device 3 comprises means 48, in particular a second function module 48, for providing information based on the retrieved activity index (compare step 32 of FIG. 8).

The functional modules 47, 48, can be implemented using software instructions such as computer program executing in a processor and/or using hardware, such as application specific integrated circuits, field programmable gate arrays, discrete logical components etc.

The teachings of the present application also encompasses a computer program product 43 comprising a computer program 44 as described above, and a computer readable means on which the computer program 44 is stored. The computer program product 43 may be any combination of read and write memory (RAM) or read only memory (ROM). The computer program product 43 may also comprise persistent storage, which for example can be any single one or combination of magnetic memory, optical memory or solid state memory.

The present teachings have mainly been described herein with reference to a few embodiments. However, as is appreciated by a person skilled in the art, other embodiments than the particular ones disclosed herein are equally possible within the scope of the present teachings, as defined by the appended patent claims.

The invention claimed is:

1. A method performed in an arrangement comprising a first device configured to handle data obtained by one or more sensor modules and a second device configured to provide information, the method comprising:
    receiving, in the first device, one or more variable values relating to one or more contexts of a system, the variable values being obtained by the one or more sensor modules,
    determining, in the first device, an activity index for one or more of the contexts based on the variable values,
    retrieving, in the second device, the activity index for a context,
    comparing the activity index to a threshold activity index, and
    providing, by the second device, a reduced amount of information based on the retrieved activity index being larger than the threshold activity index.

2. The method as claimed in claim 1, comprising, in the first device, identifying a context and determining an activity index for the identified context.

3. The method as claimed in claim 2, wherein the identifying is performed based on data obtained by the one or more sensor modules or based on data input by user.

4. The method as claimed in claim 1, wherein the providing of information comprises providing information in adjusted amount based on the activity index.

5. The method as claimed in claim 1, further comprising, in the second device, prioritizing information and wherein the information is reduced by removing information having a priority below a priority threshold value.

6. The method as claimed in claim 1, wherein the determining comprises predicting the activity index using a machine-learning algorithm.

7. The method as claimed in claim 1, wherein, in case of two or more contexts, the determining comprises grouping the two or more contexts into two or more context layers and determining an activity index for each context of each context layer.

8. The method as claimed in claim 7, further comprising comparing the activity index for each context to the threshold activity index, and wherein the providing of the reduced amount of information comprises providing only part of an available amount of information to a context having an activity index being higher than the threshold activity index and withholding the remaining part of the information.

9. The method as claimed in claim 8, wherein the information being withheld from the first context is provided to a context having an activity index being lower than the threshold activity index.

10. The method as claimed in claim 1, wherein the providing of information comprises one or more of: displaying information on a screen, providing an audible alarm, providing a call, and providing a warning in form of an alarm.

11. The method as claimed in claim 1, wherein the providing of information comprises providing audible, visual and/or tactile signals based on the activity index.

12. The method as claimed in claim 1, wherein a context is defined for one or more users located within the system.

13. The method as claimed in claim 1, wherein the sensor modules comprise one or more of: motion sensor, acceleration sensor, thermometer, sound detector, heart rate sensor, camera, microphone, a module within the system configured to detect speed of key strokes of a keyboard.

14. An arrangement comprising a first device configured to handle data obtained by one or more sensor modules and a second device configured to provide information, wherein:
    the first device comprises a processor and memory, the memory containing instructions executable by the processor, whereby the first device is operative to:
        receive one or more variable values relating to one or more contexts of a system, the variable values being obtained by the one or more sensor modules, and
        determine an activity index for one or more of the contexts based on the variable values,
    and wherein:
    the second device comprises a processor and memory, the memory containing instructions executable by the processor, whereby the second device is operative to:
        retrieve the activity index for a context,
        compare the activity index to a threshold activity index, and
        provide a reduced amount of information based on the retrieved activity index being larger than the threshold activity index.

15. A method performed in a first device of an arrangement, the first device being configured to handle data obtained by one or more sensor modules of a system, the method comprising:
    receiving one or more variable values relating to two or more contexts of the system, the variable values being obtained by the one or more sensor modules, and
    determining an activity index for one or more of the contexts based on the variable values, the determining comprising grouping the two or more contexts into two or more context layers and determining an activity index for each context of each context layer.

16. The method as claimed in claim 15, comprising identifying a context and determining an activity index for the identified context.

17. The method as claimed in claim 16, wherein the identifying is performed based on data obtained by the one or more sensor modules or based on data input by user.

18. The method as claimed in claim 15, wherein the determining comprises predicting the activity index using a machine-learning algorithm.

19. The method as claimed in claim 15, wherein a context is defined for one or more users located within the system.

20. The method as claimed in claim 15, comprising providing information based on the activity index.

21. A first device of an arrangement, the first device being configured to handle data obtained by one or more sensor modules of a system, the first device comprising a processor and memory, the memory containing instructions executable by the processor, whereby the first device is operative to:
    receive one or more variable values relating to one or more contexts of the system, the variable values being obtained by the one or more sensor modules, and
    determine an activity index for one or more of the contexts based on the variable values, the determining comprising grouping the two or more contexts into two or more context layers and determining an activity index for each context of each context layer.

22. A method performed in a second device of an arrangement, the second device being configured to provide information and the arrangement comprising a first device being configured to handle data obtained by one or more sensor modules of a system, the method comprising:
retrieving, from the first device, an activity index for a context, wherein the activity index for the context is based on variable values relating to the context, the variable values being obtained by the one or more sensor modules,
comparing the activity index to a threshold activity index, and
providing a reduced amount of information based on the retrieved activity index being larger than the threshold activity index.

23. The method as claimed in claim 22, wherein the providing of information comprises providing information in adjusted amount based on the activity index.

24. The method as claimed in claim 22, further comprising prioritizing information and wherein the information is reduced by removing information having a priority below a priority threshold value.

25. The method as claimed in claim 24, further comprising comparing the activity index for each context to the threshold activity index, and wherein the providing of the reduced amount of information comprises providing only part of an available amount of information to a context having an activity index being higher than the threshold activity index and withholding the remaining part of the information.

26. The method as claimed in claim 25, wherein the information being withheld from the first context is provided to a context having an activity index being lower than the threshold activity index.

27. The method as claimed in claim 22, wherein the providing of information comprises one or more of: displaying information on a screen, providing an audible alarm, providing a call, and providing a warning in form of an alarm.

28. The method as claimed in claim 22, wherein the providing of information comprises providing audible, visual and/or tactile signals based on the activity index.

29. The method as claimed in claim 22, wherein a context is defined for one or more users located within the system.

30. A second device of an arrangement, the second device being configured to provide information and the arrangement comprising a first device being configured to handle data obtained by one or more sensor modules of a system, the second device comprising a processor and memory, the memory containing instructions executable by the processor, whereby the second device is operative to:
retrieve, from the first device, an activity index for a context, wherein the activity index for the context is based on variable values relating to the context, the variable values being obtained by the one or more sensor modules,
compare the activity index to a threshold activity index, and
provide a reduced amount of information based on the retrieved activity index being larger than the threshold activity index.

* * * * *